United States Patent
Best et al.

(10) Patent No.: US 9,104,804 B2
(45) Date of Patent: Aug. 11, 2015

(54) METHOD AND SYSTEM FOR INVOKING JUST-IN-TIME DEBUGGER

(75) Inventors: Steven Francis Best, Westford, MA (US); Yan Li, Beijing (CN); Yao Qi, Beijing (CN); Wei Ying Yu, Beijing (CN); Yong Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1848 days.

(21) Appl. No.: 12/350,820

(22) Filed: Jan. 8, 2009

(65) Prior Publication Data
US 2009/0178028 A1    Jul. 9, 2009

(30) Foreign Application Priority Data
Jan. 8, 2008    (CN) .......................... 2008 1 0002320

(51) Int. Cl.
*G06F 11/36* (2006.01)
*G06F 9/455* (2006.01)
*G06F 9/54* (2006.01)

(52) U.S. Cl.
CPC ........ *G06F 11/3664* (2013.01); *G06F 9/45512* (2013.01); *G06F 9/541* (2013.01)

(58) Field of Classification Search
CPC .. G06F 11/3664; G06F 9/15512; G06F 9/541
USPC .......................................................... 717/124
See application file for complete search history.

(56) References Cited

U.S. PATENT DOCUMENTS

| | | | | |
|---|---|---|---|---|
| 5,526,485 A | * | 6/1996 | Brodsky | 714/38.13 |
| 5,533,192 A | * | 7/1996 | Hawley et al. | 714/28 |
| 5,774,729 A | * | 6/1998 | Carney et al. | 717/126 |
| 6,052,801 A | * | 4/2000 | Hammond et al. | 714/38.13 |
| 6,249,907 B1 | * | 6/2001 | Carter et al. | 717/129 |
| 6,353,923 B1 | * | 3/2002 | Bogle et al. | 717/128 |
| 7,203,926 B2 | * | 4/2007 | Bogle et al. | 717/124 |
| 7,275,238 B2 | * | 9/2007 | Anaya et al. | 717/129 |
| 7,353,498 B2 | * | 4/2008 | Gupta et al. | 717/125 |
| 7,401,323 B2 | * | 7/2008 | Stall et al. | 717/130 |
| 2003/0182653 A1 | * | 9/2003 | Desoli et al. | 717/138 |
| 2004/0268309 A1 | * | 12/2004 | Grover et al. | 717/120 |
| 2005/0034109 A1 | * | 2/2005 | Hamilton et al. | 717/140 |

OTHER PUBLICATIONS

"JIT debugging through OS-specific exception JIT debugging in Microsoft Windows OS" htttp://msdn2.micro ft.com/en-us/library/5hs4b7a6.aspx.*

(Continued)

*Primary Examiner* — Wei Zhen
*Assistant Examiner* — Mohammed Huda
(74) *Attorney, Agent, or Firm* — Zilka-Kotab, PC

(57) ABSTRACT

A method and system for invoking Just-In-Time debugger is described, which can provide more efficient JIT debugging for complex code mixed applications. A method for invoking a Just-In-Time (JIT) debugger according to one embodiment includes checking a code type of a code address where a JIT debugging request is triggered from a process of a code-mixed application in response to the JIT debugging request from the process; acquiring corresponding JIT debugging information for different code types of the code-mixed application; and invoking a JIT debugger corresponding to the code type in response to the checked code type of the code address in the process and the acquired corresponding JIT debugging information.

17 Claims, 5 Drawing Sheets

(56) References Cited

OTHER PUBLICATIONS

"JIT debugging through OS-specific exception JIT debugging in Microsoft Windows OS" http://msdn2.microsoft.com/en-us/library/5hs4b7a6.aspx.

"Toolfarm. The Visual Effexperts" http://toolfarm.com/labels/QC%20Integration%20FX.html.

"High-Performance, enterprise-ready fingerprint system integration, without the SDK in 24 hrs." Biometrics Fingerprint Hardware and Software http://biometrics.radiantnetwork.com/proddetail.php?prod=BPAS.

"MicroTCA for industry applications: MicroTCA: Individual components and complete systems" http://www.schroff.co.uk/internet/html_e/service/pressreleases/fa705.html.

\* cited by examiner

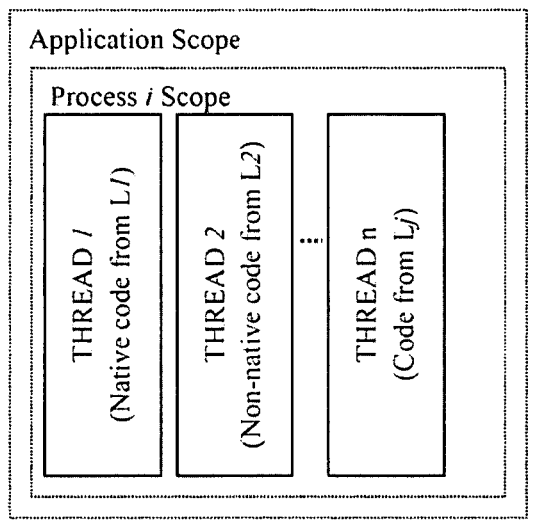
Figure 2a. Code-mixed application($n≥2$ & $j≥2$)
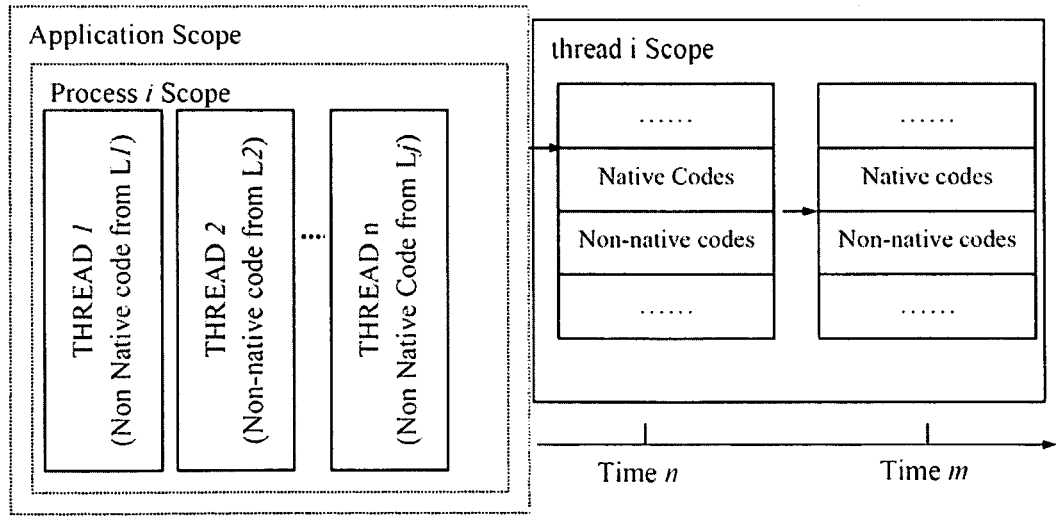
Figure 2b. Code-mixed applications
Figure 2c. Code-mixed applications

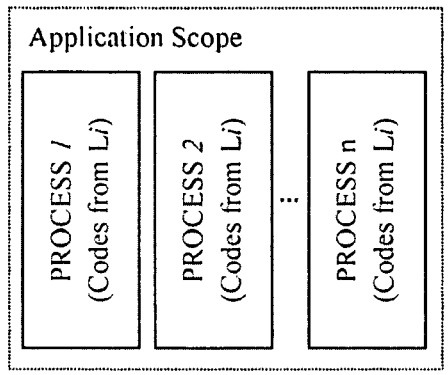
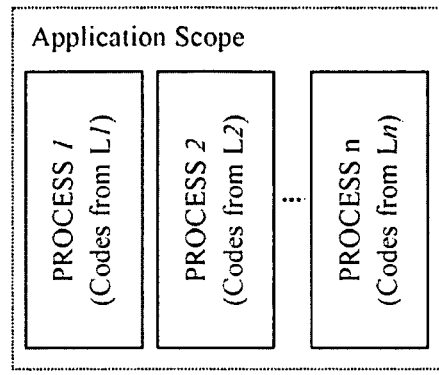
Figure 3a. Non code-mixed application
Figure 3b. Non code-mixed application
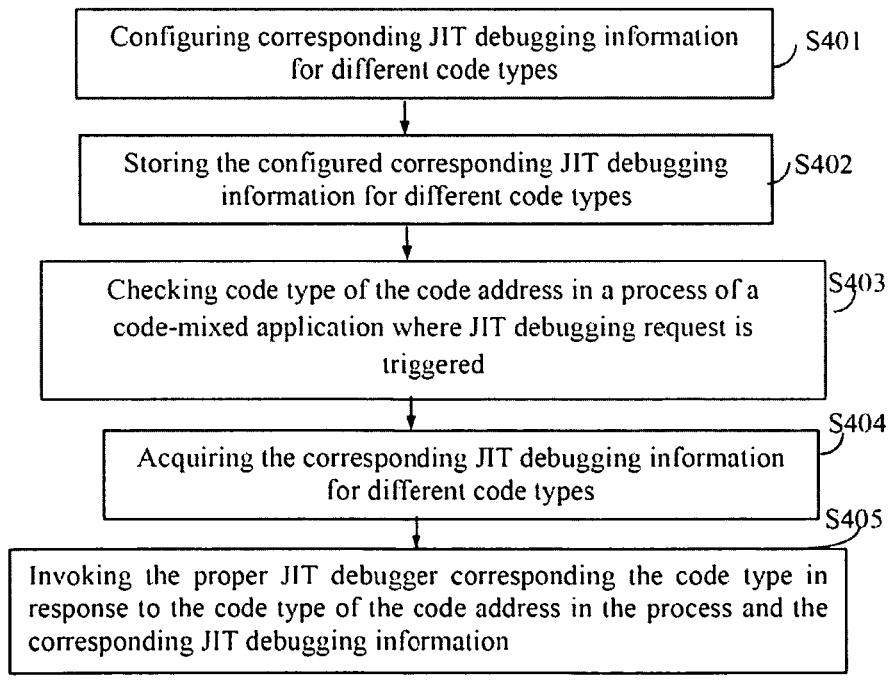
Figure 4

| JVM Libraries | Address Range |
|---|---|
| jvm.so | (E, F) |
| java.so | (G, H) |
| …… | …… |
Native libraries of JVM
| Address Range | Code Type |
|---|---|
| (E, F) | JAVA_TYPE |
| (G, H) | JAVA_TYPE |
| …… | JAVA_TYPE |
Code type information list
Figure 7
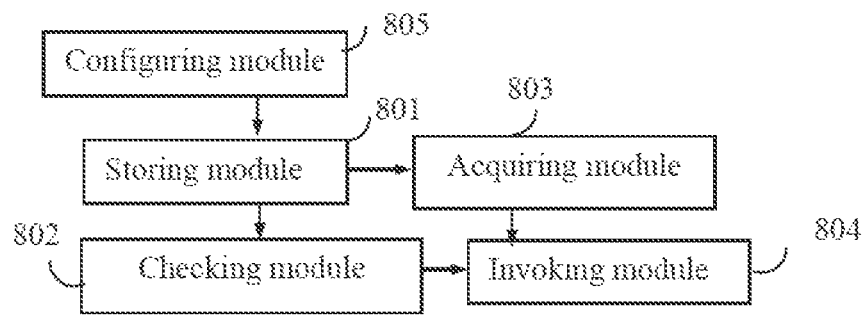
Figure 8
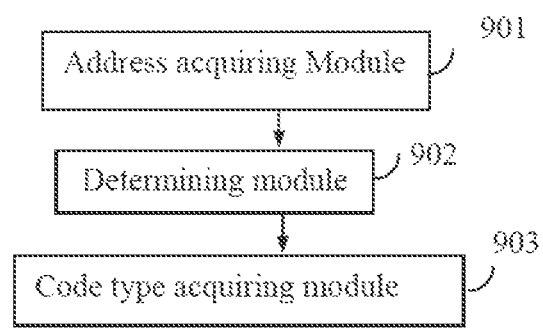
Figure 9

METHOD AND SYSTEM FOR INVOKING JUST-IN-TIME DEBUGGER

RELATED APPLICATIONS

The present application claims the priority of a Chinese patent application filed Jan. 8, 2008 under application number 200810002320.5, which is incorporated herein by reference.

BACKGROUND

The present invention generally relates to software debugging technology, particularly to a method and system for invoking Just-In-Time (JIT) debugger, in which a corresponding JIT debugger is selected for a code-mixed application.

The rising complexity of software system brings more and more bugs that can't be reproduced or occur only occasionally. The context of the program is unavailable if a debugger is started at that moment to debug that program. Thus traditional debuggers can do little on these bugs. JIT (Just-In-Time, JIT) debugging is proposed to address the above problem. JIT (Just-In-Time) debugging is a technique that a debugger could be invoked automatically when bugs mentioned above occur. It has been an integral part of modern debugging.

So far, some methods or systems have been designed to provide support for the JIT debugging, for example, JIT debugging through exception hook and JIT debugging through OS-specific exception have been proposed. However, there is no specific support provided in existing technologies for code-mixed applications.

"Code-mixed Applications" are used to denote some applications that are deployed in one native code and/or one or several non-native codes, often developed in more than one language. Generally, different modules of an application can be written in different programming languages, and compiled into the different code types.

Native codes or non-native codes have no inherent relationship with programming languages. For example, Java programs are often compiled into Java byte codes, which are non-native codes. However, Java programs could also be compiled into native codes by GCJ, or GNU Compiler for Java.

There are great differences between native codes and non-native codes. From the perspective of debugging, debuggers will use different methods to control the execution of debugging of different codes. For example, the breakpoint instruction is 0xCC for all native codes on IA32 platform, while the breakpoint instruction is 0xCA for Java byte codes, non-native codes, on Java Virtual Machine.

Most of the time, mixed code will probably exist in an application because there is typically not any one type of code that meets all requirements. Each code type has its own advantages in different business fields; for example, the non native code may be more portable while the native code is more efficient. Nowadays, more and more large applications tend to be code-mixed, such as Lotus Notes, especially with the prevalence of the Java language.

Existing methods do not provide any specific support for code-mixed applications. Only a predefined debugger can be started in the existing methods when there is a need to start JIT debugging. However, the incorrect debugger may be started for code-mixed applications in the existing methods.

FIG. 1 illustrates the existing JIT debugging process for a code-mixed application. As shown in FIG. 1, when a process i triggers JIT debugging in operation s101, it is unknown which debugger should be started. Therefore, the JIT debugger configured in advances is invoked in operation S102 and debugging is attempted in operation s103. Supposing that process i was a process in AIX operating system, comprising thread 1 in C language and thread 2 in Java language, if dbx (a C language debugger) is configured as a JIT debugger, the dbx will be invoked in any circumstance which requires JIT debugging. However, the dbx would not be much help if the codes triggering JIT debugging are located at Java Byte Code (thread 2), because dbx cannot provide JIT debugging support for Java non native code. Conversely, if jdb (a java debugger) is configured as the JIT debugger, it is also unable to do much work if the JIT debugging is from native codes (thread 1).

When traditional JIT debugging support is used for code-mixed applications, there are at least the following two problems:

1) It will cost much if JIT debugging support is implemented in all interpreters for all non native code, such as Java, C# MSIL code, etc. And with the emergence of new non native code, all of the respective interpreters are needed to be modified to provide JIT debugging support for these kinds of non native codes. So it is not feasible to use traditional ideas from business perspective.

2) It is difficult to establish a mapping relationship between operating system events and non-native code events. Once one application, especially a code-mixed application, becomes bigger and bigger, the performance tuning will be one inevitable issue. For most performance analyzers, they need to know what code, native code or non-native code, is being executed when something, such as frequent memory page swapping in operating system, happens. The traditional manner of JIT support, which often tends to be implemented within the interpreters, can't meet this requirement because there is no way for the interpreter to catch operating system low-level events.

Therefore, there is a need to provide a method and system for invoking Just-In-Time debugger, which can provide more efficient JIT debugging for the complex code-mixed application. Such method and system may not only solve the problem that existing method cannot satisfy the JIT debugging requirement for code-mixed applications, but may also overcome the two problems involved with code mixed applications.

SUMMARY

According to one aspect of this invention, there is provided a method for invoking a Just-In-Time debugger, comprising: checking a code type of a code address where a JIT debugging request is triggered from a process of a code-mixed application in response to the JIT debugging request from the process; acquiring corresponding JIT debugging information for different code types of the code-mixed application; and invoking a JIT debugger corresponding to the code type in response to the checked code type of the code address in the process and the acquired corresponding JIT debugging information.

According to other aspect of this invention, there is provided a system for invoking Just-In-Time debugger, comprising: a checking module for checking a code type of a code address where JIT debugging request is triggered from a process of a code-mixed application in response to the JIT debugging request from the process; an acquiring module for acquiring corresponding JIT debugging information for different code types of the code-mixed application; and an invoking module for invoking a JIT debugger corresponding to the code type in response to the checked code type of the code address in the process and the acquired corresponding JIT debugging information.

BRIEF DESCRIPTION OF THE SEVERAL VIEWS OF THE DRAWINGS

FIGS. 2a-c illustrate three typical code-mixed applications;

FIGS. 3a-b illustrate two typical non code-mixed applications;

FIG. 4 illustrates a method process for invoking Just-In-Time debugger according to one embodiment of the present invention;

FIG. 7 illustrates how to get code type information for JAVA code by JVM.

FIG. 8 illustrates a system block diagram for invoking Just-In-Time debugger according to one embodiment of the present invention; and FIG. 9 illustrates a block diagram of the invoking module according to one embodiment of the present invention.

DETAILED DESCRIPTION

Figure 1:
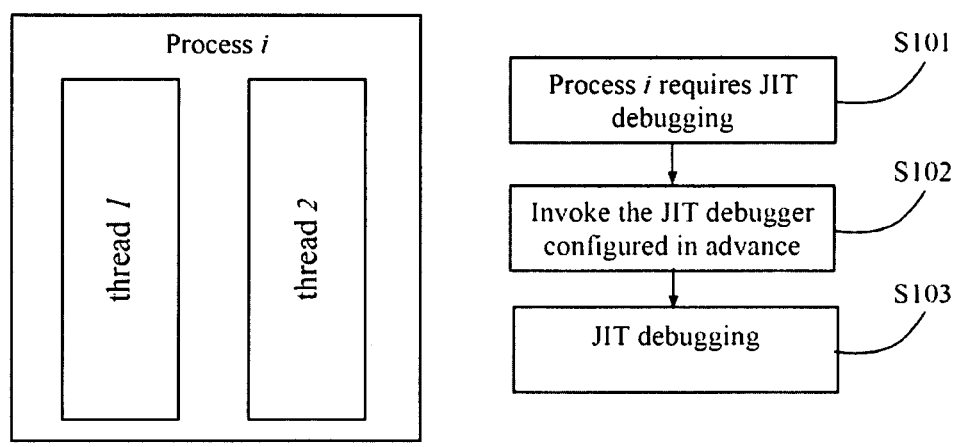
FIG. 1 illustrates the existing JIT debugging process for code-mixed application.

Preferred embodiments of the present invention will now be described more fully hereinafter below in more detail with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

In the present description, the term "native code" denotes the code that can be executed directly by processors, while "non-native code" denotes the code that cannot be executed directly by processors. An interpreter is needed to translate the non-native code to native code which the hardware processor can understand.

FIGS. 2a-c illustrates three typical code-mixed applications. In FIGS. 2a and 2b, Process i denotes any one process in an application; THREAD n denotes the No. n thread in the Process i; Lj denotes the source language for the codes of THREAD n. Therefore, one code-mixed application in FIG. 2a must have at least two threads in some one process and there are at least two different code types (native code, Java Byte Code, or other non native codes) among these threads. For example, if native codes, compiled from C/C++ programming language, invoke the Java Virtual Machine to execute the Java byte code during its running, it is a code-mixed application. And one code-mixed application in FIG. 2b must have at least two threads in a certain process and there are at least two different non-native code types among all these threads (for example, Java byte code and Microsoft's .NET byte code). Another typical example of a code-mixed application is shown by the FIG. 2c. One thread of the application may execute more than one type of code at different time; for example, a Java thread could invoke a native method through JNI (a Java Native Interface), and return back to the Java thread when the native method is finished. In the present description, JIT debugging will be described in terms of the above three types of code-mixed applications.

FIGS. 3a-b illustrate two typical non code-mixed applications. In FIG. 3a, the source codes for each process of the application are compiled from the same programming languages. And in FIG. 3b, the source codes for each process may be compiled from different programming languages. Even their source code types are different, for instance, a specific process is Java native code compiled by GCJ, and another specific process is Java byte code. However, both belong to non code-mixed applications in that existing methods can well solve their JIT debugging problem.

One goal of various embodiments is to automatically invoke a corresponding JIT debugger for a process of a code-mixed application according to its current code type when the process triggers the request for JIT debugging.

FIG. 4 illustrates a process for invoking a Just-In-Time debugger according to one embodiment of the present invention, which can provide a corresponding JIT debugger to one process in a code-mixed application. In the configuring step S401 of this method, JIT debuggers corresponding to the different code types are configured. This step is optional because the user can configure such information directly, and/or get the information of JIT debugger corresponding to the different code types in other ways; for example, such kind of information may be stored on a network node. The user may access the node to get the information directly. Thus the configuring step is optional. In addition, the configuring step can be performed on a local device, by network, e.g. such information may be configured in a network node, etc. In the optional step S402, the configured JIT debuggers corresponding to the different code types are stored.

When a process of a code-mixed application triggers the JIT debugging request, the code type of the code address where the JIT debugging request is triggered from the process of the code-mixed application is checked in step S403 in response to the JIT debugging request from the process. How to check the code type of the code address which triggers JIT debugging request will be described in detailed in another part of this specification and is omitted here. In the acquiring step S404, the corresponding JIT debugging information for different code types is acquired. In this embodiment, corresponding JIT debugging information for different code types can be maintained as a list, and the checking step and the acquiring step are exchangeable in sequence, e.g. which step is carried out first does not affect the implementation of this invention. In the invoking step S405, the corresponding JIT debugger is invoked in response to the checked code type of the code address in the process and the acquired corresponding JIT debugging information.

Then the JIT debugger corresponding to the particular code type can be invoked, so that the code-mixed application performance tuning can be supported.

Table 1 illustrates a list of corresponding JIT debuggers for different code types, which may be used to record corresponding JIT debuggers for different code types. In one approach, the executable code paths of the debuggers are shown there. Their file name can be added too. The corresponding debugger for different code types can be retrieved from the table and invoked.

TABLE 1

| Code Type | Corresponding JIT Debugger |
|---|---|
| JAVA_TYPE | /opt/ibm/j2sdk1.4.2/bin/jdb |
| C_TYPE | /usr/bin/gdb |

TABLE 1-continued

| Code Type | Corresponding JIT Debugger |
| --- | --- |
| C++_TYPE | /usr/bin/dbx |
| ... | ... |

The above list of corresponding JIT debuggers for different code types can alternatively be represented by any data structure known by those skilled in the art, which include but not limited to array, hash table, list, etc. Further, the information of corresponding JIT debuggers for different code types can be expressed in other ways known to those skilled in the art. The system can provide an interface such as an API or executable code for user to configure them. Users may be permitted to modify, add and delete the information of corresponding JIT debuggers for different code types using such interfaces. The information of corresponding JIT debuggers for different code types can be stored in a local computer, in a network node, etc. The implementation of embodiments of the present invention is not affected by the place where the information is stored, that is, when JIT debugging is requested from a process in a code-mixed application, embodiments of the present invention can be used no matter how JIT debugging is implemented. For example, when JIT debugging is implemented by JIT debugging through exception hook or through OS-specific exception, various embodiments can be used together to provide JIT debugging support for different code types in a code-mixed application.

Figure 5:
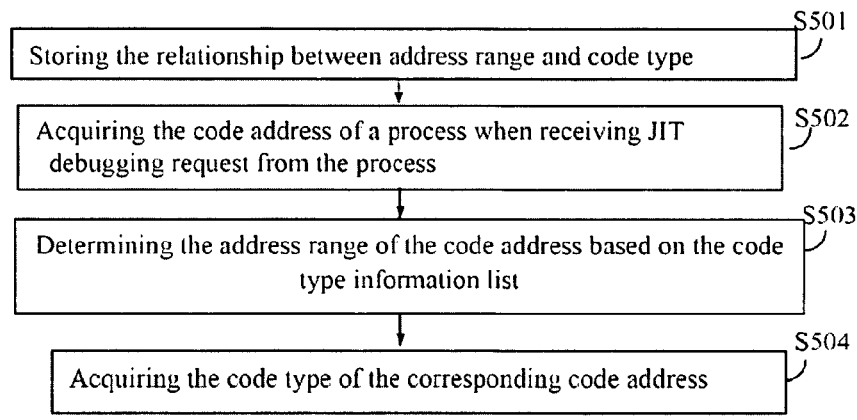
FIG. 5 illustrates a method of checking code type of a process according to one embodiment of the present invention.

FIG. 5 illustrates a method of checking a code type of a process according to one embodiment of the present invention. In order to implement this method, the code-mixed application may maintain a list of relationships between process address range and code type for each process, as shown in Table 2, in which code type for code address range (C, D) is JAVA_TYPE, and code type for code address range (E, F) is C_TYPE. As for the information in Table 1, the information in Table 2 can be represented by any data structure known by those skilled in the art, which includes but is not limited to array, hash table, list, etc. Besides, the list of relationships between process address range and code type can be expressed in other ways known to those skilled in the art, and can be stored in the local computer or in network storage.

TABLE 2

| Address Range | code type |
| --- | --- |
| (C, D) | JAVA_TYPE |
| (E, F) | C_TYPE |
| ... | ... |

Thus in the method of checking a code type of a process, the first step S501 is to store the relationship between address range and code type, which is an optional step, because the relationship between address range and code type may be obtained by other ways; for example, the relationship may have been included in the system or device. Then when receiving a JIT debugging request for a process, in address acquiring step S502, the code address which triggers a JIT debugging request is acquired, such as by reading the value in a program counter register. Then in the determining step S503, the address range is determined; and in the code type acquiring step S504, the code type of the determined address range is acquired based on the list of relationships between process address range and code type. Thus the code type of the executing code in a process can be obtained.

Figure 6:
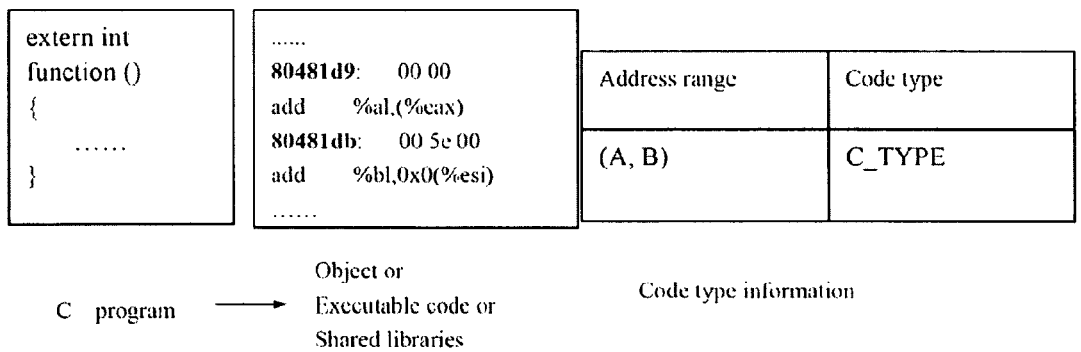
FIG. 6 illustrates how to get code type information of C/C++ program.

The code type information in Table 2 can be automatically generated by the compiler. For native code, code type information can be stored in a code file; for example, the code type can be stored in object file, shared library or executable files for C/C++ programs which are compiled into native code. FIG. 6 illustrates how to obtain code type information of a C/C++ program. In FIG. 6, the left C program is compiled as native code, and the code address range is from 0x80481D9H to 0x80481EAH. The corresponding code type can be filled in based on the above information; for example, A is 0x80481D9H, B is 0x80481EAH. For other languages in which code type can be automatically generated by compiler, FORTRAN, for example, its corresponding code type may be generated during compiling and stored in output executable or object files. The method to obtain the relationship between address range and code type may be similar to the one for C/C++ language.

For non native languages, the code type information may be determined by its interpreter (all interpreters are native code); for example, Java Virtual Machine (JVM) (including JVM executable code, native code, and shared library, etc) is an application of native code. JVM will bring code type information for the Java byte code interpreted by JVM. As shown in FIG. 7, it is shown how to get the code type information for JAVA language by JVM. In FIG. 7, the loader in operating system will identify a library's code type and update the list of code type shown in FIG. 7 if the library of native code is loaded during the execution of a code-mixed application. For other languages in which code type can be automatically generated by an interpreter, C#, a non native code, for example, its corresponding code type is determined by the related library in its interpreter .NET FRAME WORK. The method to obtain the relationship between address range and code type is similar with the one for JAVA language.

FIG. 8 illustrates a system block diagram for invoking corresponding Just-In-Time debugger according to one embodiment of the present invention. In the system, a process in a code-mixed application can invoke corresponding JIT debuggers for its code type. The system comprises: configuring module 805 for configuring the corresponding JIT debugger for different code types; storing module 801 for storing the configured JIT debugger information for different code types; checking module 802 for checking a code type of a code address which JIT debugging request is triggered from a process of a code-mixed application; acquiring module 803 for acquiring the corresponding JIT debugging information for different code types; and invoking module 804 for invoking the corresponding JIT debugger to the code type in response to the checked code type of the code address in the process and the acquired corresponding JIT debugging information. In the system, the configuring module 805 is an optional module. The storing module 801 can obtain or store the information of corresponding JIT debugger for different code types by other ways, and then there is no need to configure such information by the configuring module 805. The storing module 801 also is an optional module since such information can be obtained by other ways.

FIG. 9 illustrates a block diagram of the invoking module 804. The block diagram comprises: address acquiring module 901 for acquiring the code address triggering the JIT debugging request; determining module 902 for determining which address range the code address triggering the JIT debugging request belongs to; code type acquiring module 903 for acquiring the code type of the determined address range based on the list of relationships between address range and code type.

Alternatively, the storing module 801 may also be used to store the relationship between address range of a process and code type, so that the determining module 902 can determine which address range the code address triggering the JIT debugging request belongs to based on the list of relationships between process address range and code type, and the acquiring code type module 903 can acquire the code type of the determined address range.

Methods of obtaining address range and corresponding code type have been described by taking C/C++, FORTURN, and JAVA language as examples in which a compiler or interpreter automatically generates code type information in the foregoing method description, and the same method may be used to get such kind of information in the system.

Several advantages of embodiments of the present invention are:

1. Being able to automatically choose a corresponding debugger according to the code type triggering JIT debugging.
2. Facilitating provision of JIT debugging support for new interpreting languages.
3. The ability to provide support for performance tuning on code-mixed applications.

It should be pointed out that the modules in the system of this invention can be implemented by hardware circuit such as Very Large Scale Integrated (VLSI) Circuit or gate array, semiconductor such as logic chips and transistors, or programmable hardware device such as field programmable gate array, programmable logic device, or by software executing on various types of processors, or by the combination of above hardware circuit and software.

The present invention also provides a program product, which comprises the program code implementing the above methods and medium for storing the program code.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the illustrative embodiments have been described herein with reference to the accompanying drawings, it is to be understood that the present invention is not limited to those precise embodiments, and that various other changes and modifications may be affects therein by one of ordinary skill in the related are without departing from the scope or spirit of the invention. All such changes and modifications are intended to be included within the scope of the invention as described by the appended claims.

What is claimed is:

1. A method for invoking a Just-In-Time (JIT) debugger, comprising:
    checking a code type of a code address where a JIT debugging request is triggered from a process of a code-mixed application in response to the JIT debugging request from the process;
    acquiring corresponding JIT debugging information for different code types of the code-mixed application; and
    invoking a JIT debugger corresponding to the code type in response to the checked code type of the code address in the process and the acquired corresponding JIT debugging information;
    acquiring the code address triggering the JIT debugging request upon receipt of the JIT debugging request from the process;
    determining an address range of the code address triggering the JIT debugging request; and
    acquiring the code type of the determined address range based on a list of relationships between process address range and code type.

2. The method as recited in claim 1, further comprising: configuring JIT debuggers for different code types.

3. The method as recited in claim 2, further comprising: storing the JIT debuggers configured for the different code types, the JIT debugging information being about the JIT debuggers corresponding to the different code types.

4. The method as recited in claim 3, wherein a list is used to store the information about the JIT debuggers corresponding to the different code types.

5. The method as recited in claim 1, further comprising storing the list of the relationships between process address range and code type.

6. The method as recited in claim 5, wherein in the code type acquiring step, the code type corresponding to the address range is acquired from the stored list of the relationships between address range and code type.

7. The method as recited in claim 6, wherein for the programming language compiled by a compiler, the list of the relationships between address range and code type is generated by the compiler.

8. The method as recited in claim 6, wherein for the program language executed by an interpreter, the list of the relationships between address range and code type is generated by the interpreter.

9. A system for invoking a Just-In-Time (JIT) debugger, comprising:
    a processor;
    a checking module for checking a code type of a code address where JIT debugging request is triggered from a process of a code-mixed application in response to the JIT debugging request from the process;
    an acquiring module for acquiring corresponding JIT debugging information for different code types of the code-mixed application, the JIT debugging information being about JIT debuggers configured for the different code types; and
    an invoking module for invoking a JIT debugger corresponding to the code type in response to the checked code type of the code address in the process and the acquired corresponding JIT debugging information, wherein the invoking module comprises:
    an address acquiring module for acquiring the code address triggering the JIT debugging request upon receipt of the JIT debugging request from the process;
    a determining module for determining an address range of the code address triggering the JIT debugging request; and
    a code acquiring module for acquiring the code type of the determined address range based on a list of relationships between process address range and code type.

10. The system as recited in claim 9, further comprising: a configuring module for configuring the JIT debuggers for different code types.

11. The system as recited in claim 10, further comprising: a storing module for storing the configured JIT debuggers for different code types.

12. The system as recited in claim 9, wherein a list is used to store the information of JIT debuggers corresponding to different code types.

13. The system as recited in claim 9, further comprising a module for storing the list of the relationship between address range and code type.

14. The system as recited in claim 13, wherein in the acquiring code type module, the code type corresponding to the address range is acquired from the stored list of the relationships between address range and code type.

15. The system as recited in claim 14, wherein for the program language compiled by a compiler, the list of the relationships between address range and code type is generated by the compiler.

16. The system as recited in claim 14, wherein for the program language executed by an interpreter, the list of the relationships between address range and code type is generated by the interpreter.

17. A computer program product for invoking a Just-In-Time (JIT) debugger, comprising:
    a non-transitory computer usable medium having computer usable program code embodied therewith, the computer usable program code comprising:
    computer usable program code configured to check a code type of a code address where a JIT debugging request is triggered from a process of a code-mixed application in response to the JIT debugging request from the process;
    computer usable program code configured to acquire corresponding JIT debugging information for different code types of the code-mixed application;
    computer usable program code configured to invoke a JIT debugger corresponding to the code type in response to the checked code type of the code address in the process and the acquired corresponding JIT debugging information;

computer usable program code configured to acquire the code address triggering the JIT debugging request upon receipt of the JIT debugging request from the process;

computer usable program code configured to determine an address range of the code address triggering the JIT debugging request; and computer usable program code configured to acquire the code type of the determined address range based on a list of relationships between process address range and code type.

* * * * *